(12) United States Patent
Lee

(10) Patent No.: US 11,788,194 B2
(45) Date of Patent: Oct. 17, 2023

(54) QUANTUM KINETIC FUSOR

(71) Applicant: McKane B. Lee, Arlington, WA (US)

(72) Inventor: McKane B. Lee, Arlington, WA (US)

( * ) Notice: Subject to any disclaimer, the term of this patent is extended or adjusted under 35 U.S.C. 154(b) by 476 days.

(21) Appl. No.: 17/005,663

(22) Filed: Aug. 28, 2020

(65) Prior Publication Data
US 2021/0156037 A1     May 27, 2021

Related U.S. Application Data

(60) Provisional application No. 62/938,630, filed on Nov. 21, 2019.

(51) Int. Cl.
| | |
|---|---|
| *C02F 1/48* | (2023.01) |
| *C25B 1/04* | (2021.01) |
| *C25B 11/00* | (2021.01) |
| *C25B 9/17* | (2021.01) |
| *C25B 9/65* | (2021.01) |

(52) U.S. Cl.
CPC ............. *C25B 1/04* (2013.01); *C25B 9/17* (2021.01); *C25B 9/65* (2021.01); *C25B 11/00* (2013.01)

(58) Field of Classification Search
CPC .... C25B 1/04; C25B 9/17; C25B 9/65; C25B 11/00; C02F 1/48; C02F 1/484; C02F 11/131; C02F 11/15; C02F 2201/48
See application file for complete search history.

(56) References Cited

U.S. PATENT DOCUMENTS

| | | | | |
|---|---|---|---|---|
| 9,464,358 | B2* | 10/2016 | Alcantara | ................. C25B 9/19 |
| 2009/0224545 | A1* | 9/2009 | Davidson | ................ F22B 1/021 60/645 |
| 2012/0222954 | A1* | 9/2012 | Lothring | .................... C25B 1/04 204/278 |
| 2016/0230292 | A1* | 8/2016 | Lorge | ......................... C12P 3/00 |
| 2019/0136391 | A1* | 5/2019 | Britt | .......................... C25B 1/55 |
| 2019/0382290 | A1* | 12/2019 | Fisher | ..................... C02F 1/488 |

* cited by examiner

*Primary Examiner* — Zulmariam Mendez
(74) *Attorney, Agent, or Firm* — Emerson, Thomson & Bennett, LLC; Roger D. Emerson; Matt J. Wilson

(57) ABSTRACT

Provided in this disclosure is an electrolysis system using voltage in a purely physical process, without resorting to passing current through an electrolyte in a chemical process. The present invention includes a tri-coil design resonant cavity transformer that utilizes the dielectric properties of a material acting as part of a "closed loop" electrical (Resistor, Inductor, Capacitor) RLC circuit. The tri-coil transformer (or TCT) is tuned to the dielectric properties of a suitable material, which can be water, liquid metals, or even ambient air. The TCT can be a tri-coil resonating cavity transformer employing either a Maxwell or Helmholtz tri-coil design. The present invention entails a physical approach to electrolysis based on voltage and not amperage to dissociate a selected dielectric medium, an approach that is 180 degrees out of phase from traditional Faraday electrolysis.

9 Claims, 17 Drawing Sheets

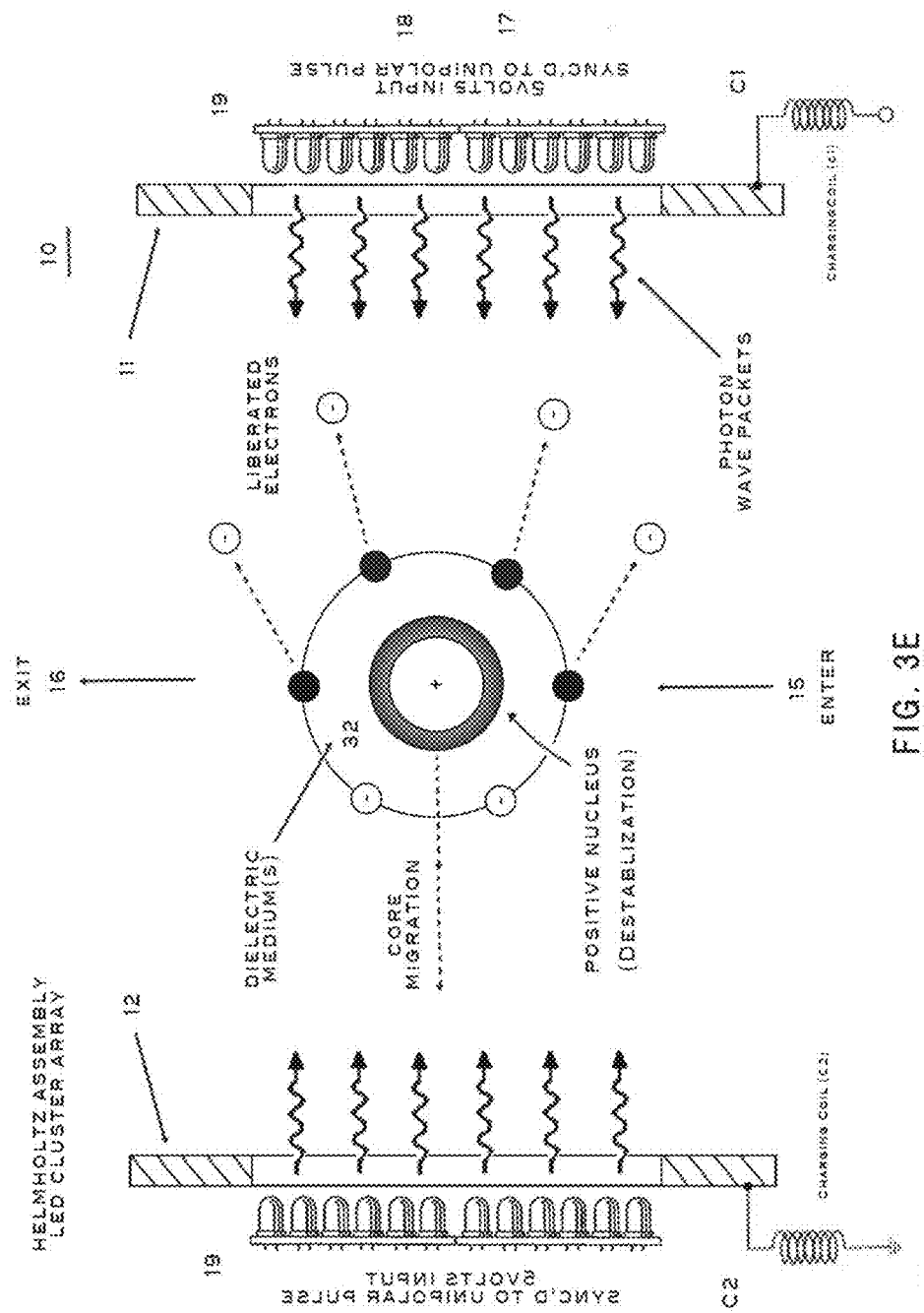

QUANTUM KINETIC FUSOR

CROSS-REFERENCE TO RELATED APPLICATIONS

This application claims the benefit of U.S. provisional patent application Ser. No. 62/938,630, filed on Nov. 21, 2019, which is incorporated herein by reference.

I. BACKGROUND

A. Field of the Invention

This invention pertains to the field of electrolysis, particularly for the purpose of dissociating water molecules into their hydrogen and oxygen constituents.

B. Description of Related Art

Electrolysis is typically a chemical process performed by passing a direct electrical current through an ionic substance, such as a salt, dissolved in a suitable solvent such as water, producing chemical reactions at the electrodes and decomposition of the materials. An electrolysis operation employs an electrolyte, which can be a solution containing free ions, such as a salt dissolved in water.

Electrodes, typically of metal or other suitable material, are selected based on chemical reactivity between the electrode and electrolyte and manufacturing cost. An electrical potential is applied across a pair of electrodes immersed in the electrolyte. Each electrode attracts ions that are of the opposite charge. Positively charged ions (cations) move towards the electron-providing (negative) cathode. Negatively charged ions (anions) move towards the electron-extracting (positive) anode.

Electrolysis has historically been a chemical process, employing direct current in chemical equipment and processes, as performed for nearly two centuries since the investigations of Michael Faraday. However, it has not been known in the art to perform electrolysis using purely physical processes.

II. SUMMARY

The present invention performs electrolysis using voltage in a purely physical process, without resorting to passing current through an electrolyte in a chemical process. The present invention includes a tri-coil design resonant cavity transformer that utilizes the dielectric properties of a material acting as part of a "closed loop" electrical (Resistor, Inductor, Capacitor) RLC circuit. The tri-coil transformer (or TCT) is tuned to the dielectric properties of a suitable material, which can be water, liquid metals, or even ambient air. The TCT can be a tri-coil resonating cavity transformer employing either a Maxwell, Helmholtz and/or Caduceus tri-coil design. The present invention entails a physical approach to electrolysis based on voltage and not amperage to dissociate a selected dielectric medium, an approach that is 180 degrees out of phase from traditional Faraday electrolysis.

A pulsing resonant cavity is disclosed for performing electrolysis upon a dielectric medium. A generally cylindrical housing is provided having an interior and an exterior and a cylindrical axis, and including a flow passage having an entrance port and an exit port for respectively admitting and discharging the dielectric medium. The housing is preferably made of Delrin. A tri-coil assembly is formed on the exterior of the housing centered on the cylindrical axis. The tri-coil assembly has primary and secondary coils retained centrally between first and second exterior coils to create a toroidal magnetic field within the resonant cavity oscillating at a resonant frequency of the dielectric medium within the flow passage, to dissociate the dielectric medium.

A positive electrode and a negative electrode are concentrically located in the interior of the housing, centered on the cylindrical axis. The positive and negative electrodes are cylindrical and spaced to define the flow passage therebetween. The positive and negative electrodes create an electrostatic field within the flow passage to dissociate the dielectric medium.

A light assembly cluster array is concentrically mounted around the positive and negative electrodes for pulsing light intensity and targeting electron orbitals in the dielectric medium in the flow passage to dissociate the dielectric medium. The light assembly cluster array is preferably an LED cluster. An acrylic lens is retained concentrically between the light assembly cluster array around the positive and negative electrodes and centered on the cylindrical axis to disrupt photon wave propagation into and around voltage zones of the electrodes.

The pulsating resonant cavity for performing electrolysis also includes a first terminal for applying a +5 volt DC pulse to the light assembly cluster array and a second terminal for applying a −5 volt DC pulse to the light assembly cluster array. The pulsating resonant cavity also includes an electron extraction grid to capture electrons migrating from the resonant cavity. In the preferred embodiment, the first and second exterior coils are bifilar coils that establish opposing magnetic field flux fields. Also, the positive and negative electrodes are spaced at about 0.0625 inches. Preferably, the dielectric medium is water and the resonant frequency can range from 1 Hz-1 Mhz for dissociation into hydrogen and oxygen. However, other dielectric media having respective resonant frequencies can also be employed.

Other benefits and advantages of this invention will become apparent to those skilled in the art to which it pertains upon reading and understanding of the following detailed specification.

III. BRIEF DESCRIPTION OF THE DRAWINGS

The invention may take physical form in certain parts and arrangement of parts, embodiment of which will be described in detail in this specification and illustrated in the accompanying drawings which form a part hereof and wherein.

Figure 3A:
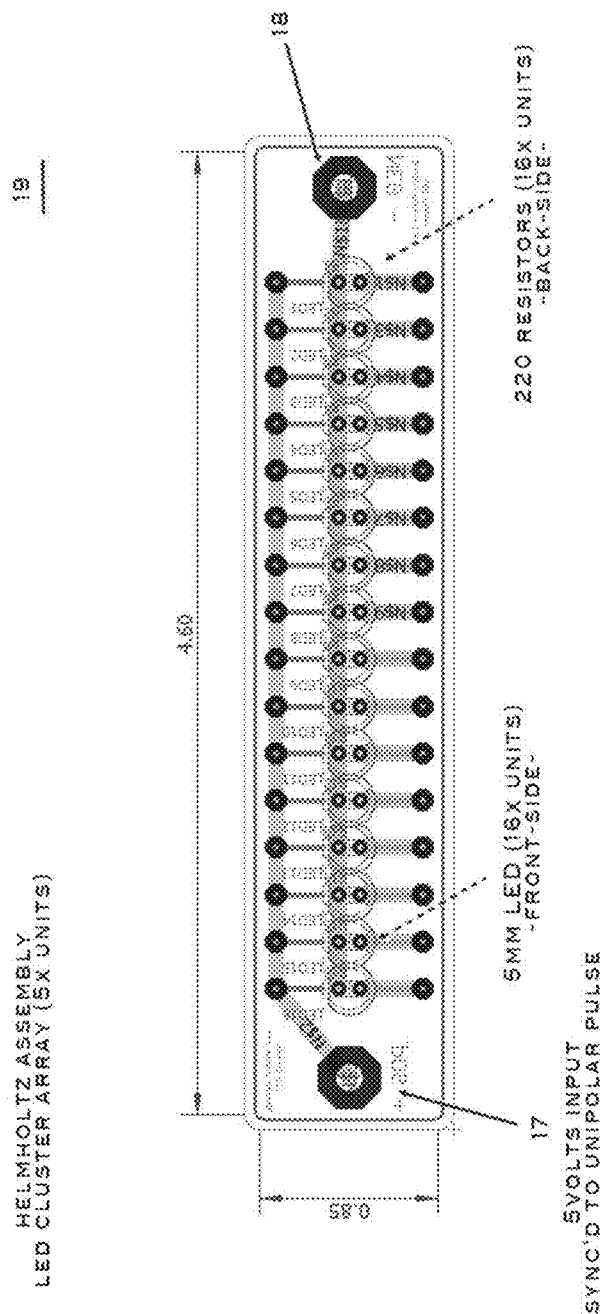
FIG. 3A is a side-sectional view of a Helmholtz assembly LED cluster array in accordance with an embodiment of the present invention.
Figure 3B:
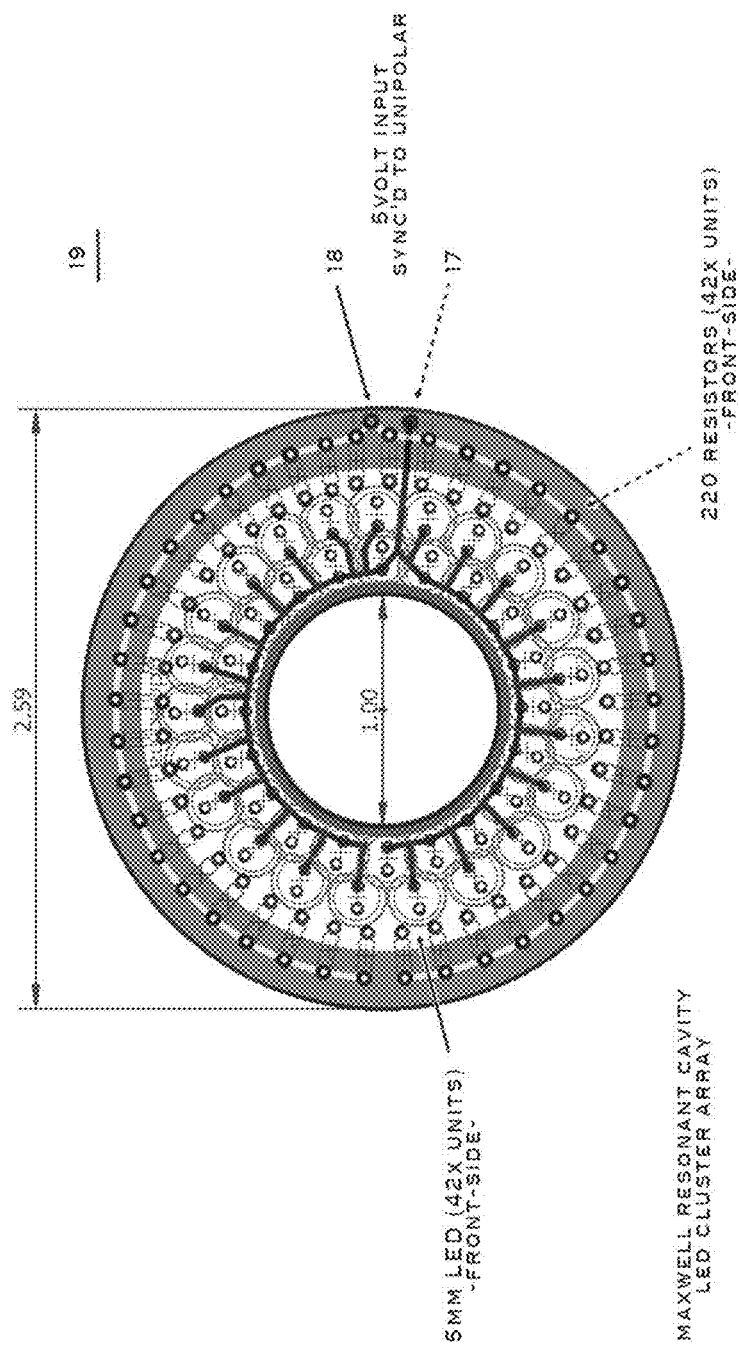
Figure 3C:
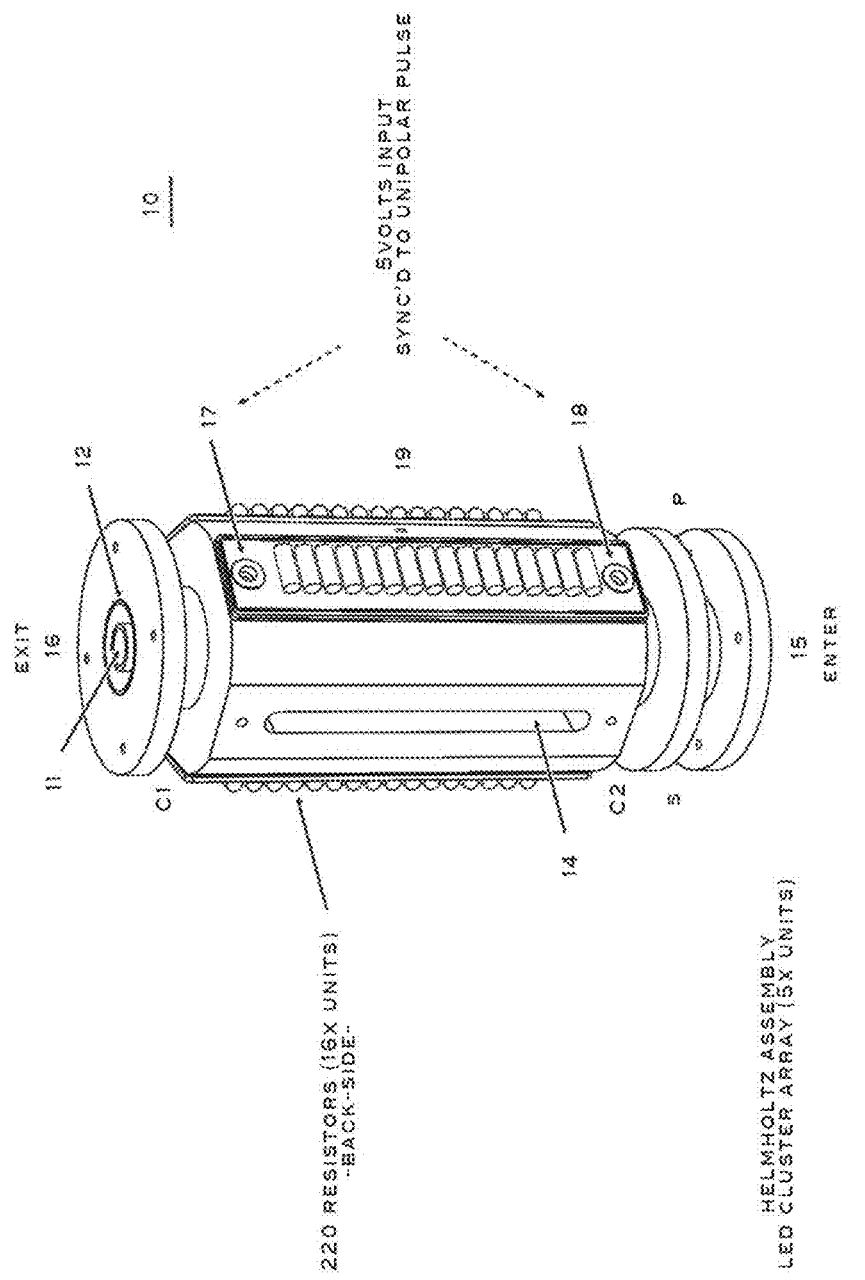
Figure 3D:
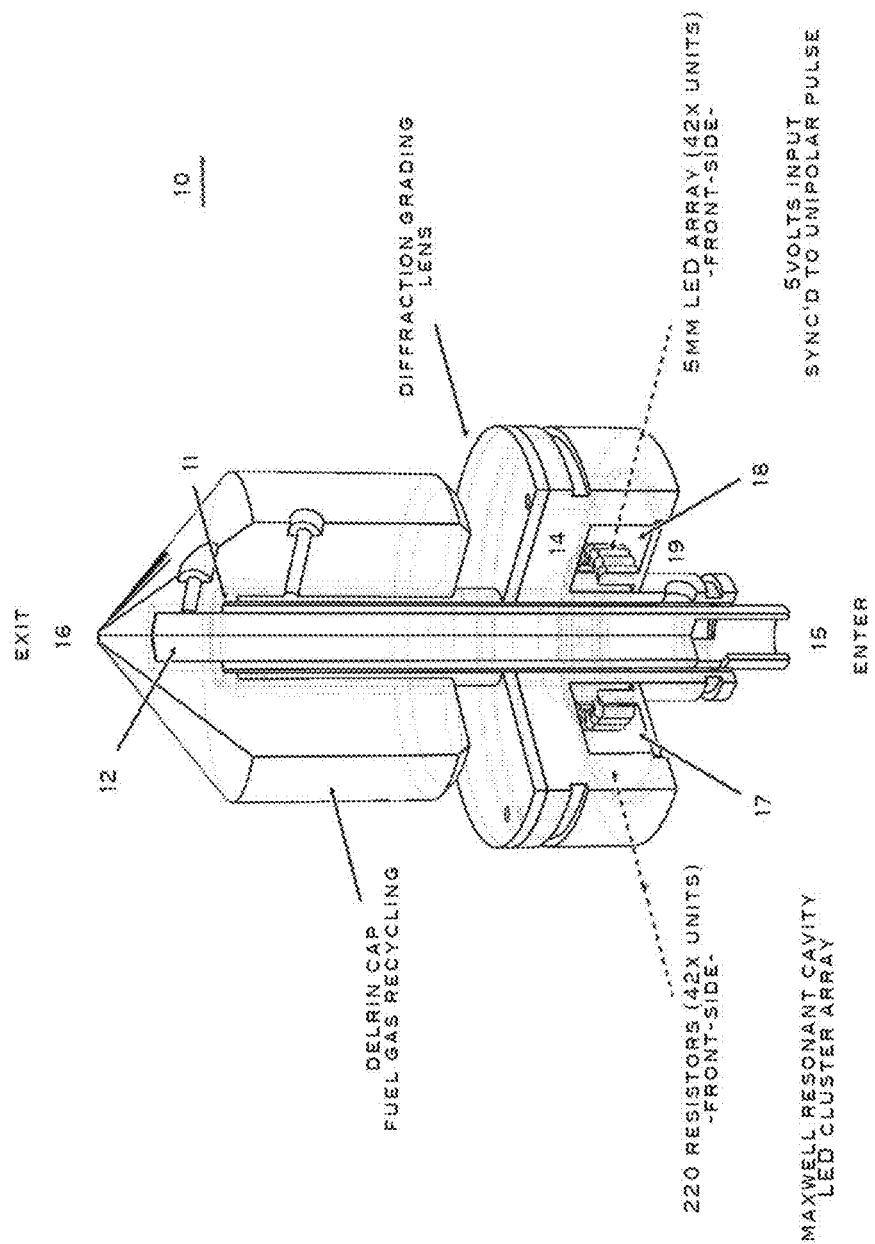

FIG. 3B is cross-sectional view of a Maxwell assembly LED cluster array in accordance with an embodiment of the present invention FIG. 3C is a perspective view of a Helmholtz assembly LED cluster array in accordance with an embodiment of the present invention FIG. 3D is a perspective partial cutaway view of a Maxwell resonant cavity LED cluster array in accordance with an embodiment of the present invention.

FIG. 3E is an operative depiction of a Maxwell and Helmholtz resonant cavity cluster array in accordance with an embodiment of the present invention.

IV. DETAILED DESCRIPTION

Figure 1A:
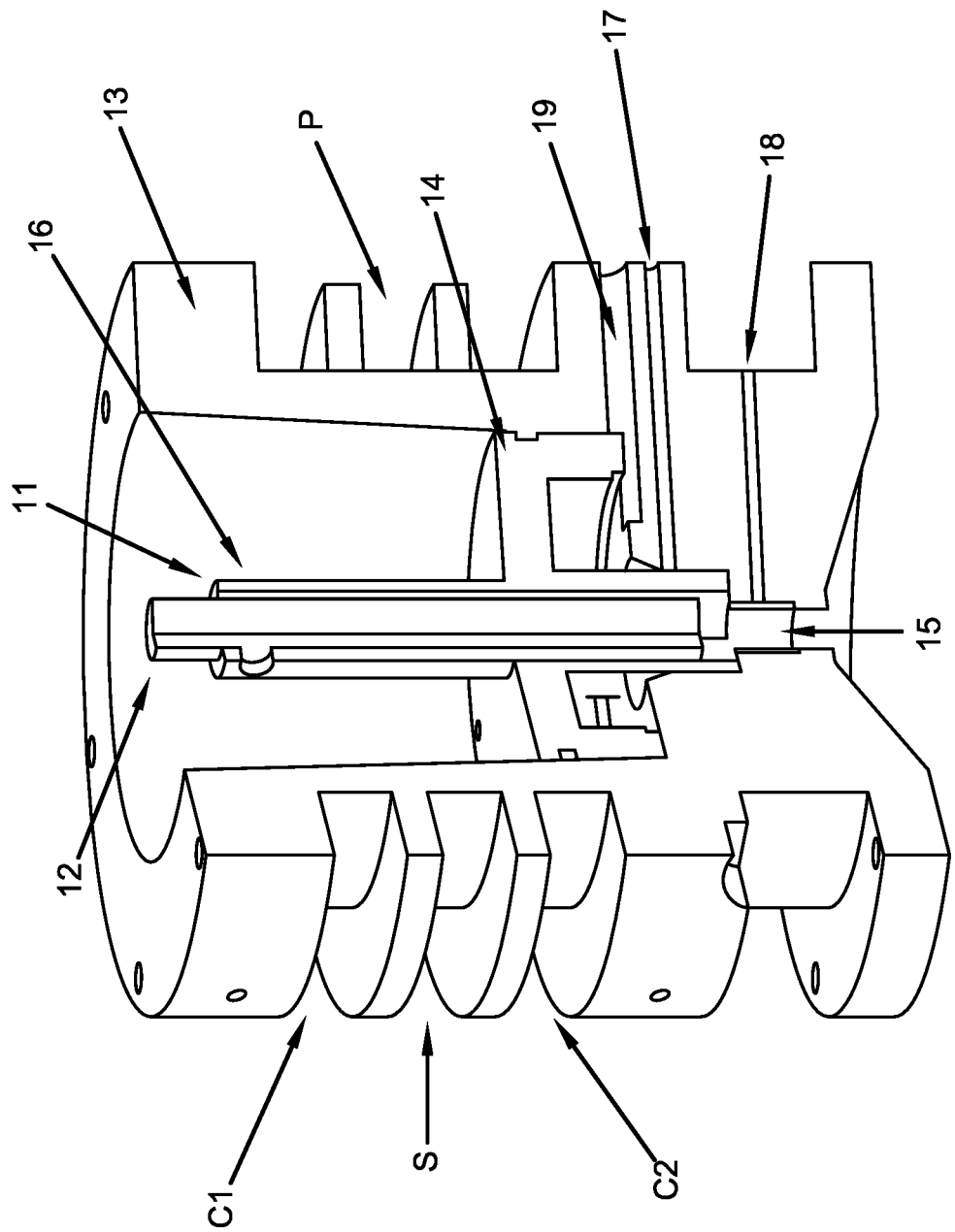
FIG. 1A shows a Maxwell type tri-coil transformer resonant cavity suited for liquid dielectric materials according to an exemplary embodiment of the present invention.

Referring now to the drawings wherein the showings are for purposes of illustrating embodiments of the article only and not for purposes of limiting the same, and wherein like reference numerals are understood to refer to like components:

FIG. 1A shows an exemplary embodiment of the present invention including a modular Maxwell tri-coil resonant pulsing cavity 10. The resonant pulsing cavity 10 is electrically driven with a DC electric unipolar pulse to stimulate the ti-coils C1, S, C2. The cavity can be configured in any coil design including but not limited to the Maxwell orientation of FIG. 1A, Helmholtz coil designs according to FIG. B, and any other configuration as would occur to those skilled in the art.

Figure 1B:
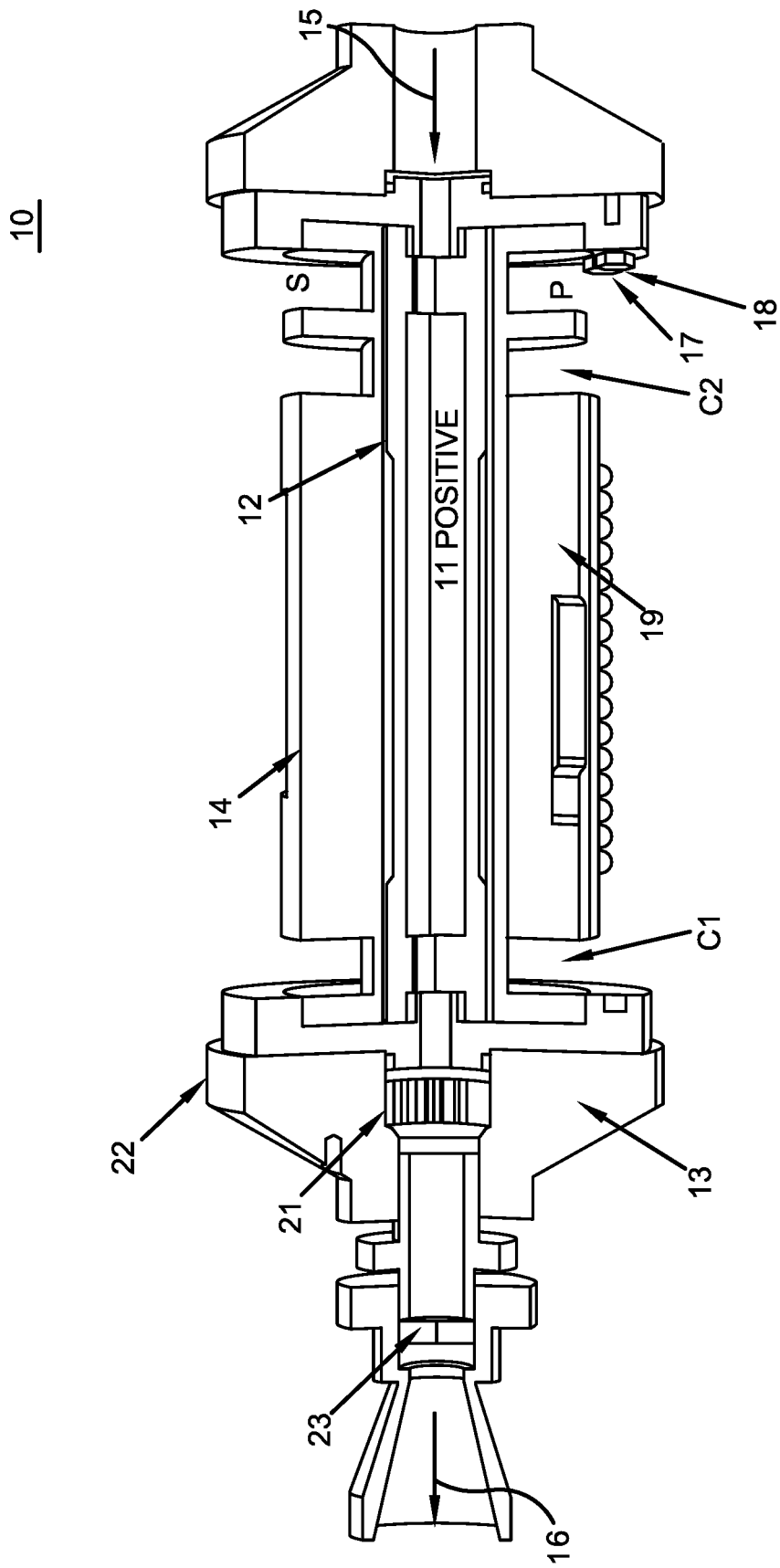
FIG. 1B shows an upper Helmholtz type tri-coil transformer resonant cavity suitable for gaseous matter dielectric materials according to an alternate exemplary embodiment of the present invention.

As indicated in FIGS. 1A and 1B, the resonant pulsing cavity 10 comprises a generally cylindrical housing 13 having an interior and an exterior and a cylindrical axis, and including a flow passage having an entrance port 15 and an exit port 16 for respectively admitting and discharging the dielectric medium. A tri-coil assembly is formed on the exterior of the housing 13 centered on the cylindrical axis. The tri-coil assembly includes the primary coil P and a secondary coil S, sandwiched between first and second exterior coils C1, C2. The primary and secondary coils P, S are retained centrally between first and second exterior coils C1, C2 to create a toroidal magnetic field within the resonant cavity oscillating at a resonant frequency of the dielectric medium within the flow passage. The P coil rest over the S coil and is energized via mutual magnetic induction by incoming said unipolar pulse train. Transformer tape or electrical tape separates base coil S and P coil acting as a stopgap. Increasing the turn ratio of S to P raises voltage intensities to the electrodes 11 and 12 respectively. This oscillating toroidal magnetic field is effective at dissociating the dielectric medium. Those skilled in the art will vary input voltage with proper turn counts to obtain proper resonant frequencies to selected dielectrics.

The cavity 10 further includes a positive electrode 11 and a negative electrode 12 concentrically located in the interior of the housing 13, centered on the cylindrical axis. The positive and negative electrodes 11, 12 are cylindrical and spaced to define the flow passage therebetween. The positive and negative electrodes 11, 12 create an electrostatic field within the flow passage to further assist in dissociating the dielectric medium. The coils P, S, C1, C2 are retained around the generally cylindrical housing 13, which is preferably made of Delrin, sold by DuPont, a trade name for polyoxymethylene, an engineering thermoplastic used in precision parts requiring high stiffness, low friction, and excellent dimensional stability.

A light assembly cluster array, preferably an LED cluster array 19, is concentrically mounted around the positive and negative electrodes 11, 12 for pulsing light intensity and targeting electron orbitals in the dielectric medium in the flow passage to further assist in dissociating the dielectric medium. An acrylic lens 14 is retained concentrically between the light assembly cluster array 19 around the electrodes 11, 12.

A terminal 17 is pulsed +5 volts DC to the LED cluster 19 and terminal 18 is pulsed −5 volts DC to the LED cluster array 19. These are synchronized with unipolar pulse train to voltage zones. Squarewave signals from an electric PCB board (FIG. 2D) are sent to a low voltage amplifier for the LED array 19, while at the same time, the signals are sent to a high-powered amplifier as the Unipolar trigger pulses 44 for TCT 10. An electron extraction grid 21 is placed on top of and in spaced relationship to the resonant cavity structure 10. When a positive electrical potential is placed on opposite side of the electrical load, electrons migrate toward "closed-loop" ground state. (See FIG. 2B.) Electrons flow from the capacitor to and through a resistive load element and are consumed in the form of heat and light. Electrons negative differential pressure increases between electrodes 11 and 12. Electricity (i.e. electrons) is now harnessed from water, air, metallic liquids and even vacuum dielectric mediums 32 using only voltage potential 44. Simply increase voltage potential to increase electron flow rate through electric load devices. (See FIG. 2B.)

The embodiment of FIG. 1B specifically includes an electron extraction grid 21 and an electron terminal 22, and also a quenching disc nozzle 23. The quenching disc nozzle 23 is an alumina ceramic wafer or rod with micro-drilled holes 0.010-0.015 inches diameter. (See FIG. 1D.) The ceramic disk body should be 0.25-0.75 inches thick. A body thinner than 0.125 inches can pose a risk of detonation protection failure to explosive hydrogen and oxygen gases. The ceramic disk is the final safety feature for exiting gases and provides a steady and safe orifice portal for hydrogen burning. The quenching disk nozzle 23 also acts as a heat sink. FIGS. 3A, 3B, 3C, and 3D depict aspects of the light cluster array 19. 220 ohm resisters establish 3.1 volt constant DC power to the 5 mm LED cluster array 19, pulsed according to resonance of TCT network coils 44. This targets the electron's orbiting cloud wave function for enhanced fuel gas energy outputs. Photon energies promote electron migration during unipolar electron extraction pulses 44 for easy capture within a "closed-loop" circuit network.

The present invention is selectively attuned to the respective resonant frequencies of selected dielectric media and activated electrically through the resonating tri-coil transformer cavity 10. The intrinsic dielectric properties of water, metallic liquids, ambient air, noble gases, vacuum space and any other dielectric constant media are utilized as part of a tuned, "closed loop" Resistor (R), Inductor (L), Capacitor (C) circuit. The resonating RC circuit generates simple harmonic electrical ionic wave fluctuations during oscillation impulses, which can be electrically amplified using a combination of integrated circuits and uniquely designed inductive coils (resistive or copper). Amplitude modulation principles are utilized within the diode/coil arrangements to enhance the voltage wave charging effect, plasma oscillations, to the capacitive plates. Voltage pulse frequency should always be positive in reference to ground state. Interfaced power transistors maximize the operational states of voltage intensity into the present invention.

In an exemplary aspect, water molecules as the selected dielectric material can be economically electrolyzed (de-coupled) into combustible gas ions of hydrogen and oxygen for utilization with propulsion rockets, internal combustion engines, boilers and other applications. Other types of dielectric materials can be broken down into electrically polarized constituent parts for specific applications using resonant voltage spikes and magnetic resonant flux field lines. These resonant voltage spikes can be tuned to a specific electrode's natural acoustics frequency to further amplify the dissociation using the Helmholtz resonator effect. Established "locked-on or tuned" RLC resonant frequencies electrically stabilize the device for optimum performance and production (dissociation) operations with economic amperage leakage rates. This is a self-sustained-oscillation due to impedance (balanced) electron migrations within the system.

A Helmholtz resonator is an acoustic enclosure with a small opening which causes the enclosure to resonate. The frequency at which it resonates depends on the geometry of the resonator. The electrodes 11, 12 are "Exciter" plates that electrically vibrate during resonance with the TCT "closed-loop" network. Acoustic resonance of stainless steel T304 has peaks between at 5 Khz and 12 Khz based on the 4-inch tube and the 5-inch round rod electrodes of the device. Resonant acoustic ringing sounds can be heard with the human ear. The highest (sharp spike acoustic intensity of crystal lattice) acoustic peak of the "Exciters" is at 7 Khz based on atomic lattice composition and structure dimensions of the stainless T304 (gap spacing—small opening). Those skilled in the art will tune TCT to resonate at 7 Khz to enhance the Helmholtz Resonator phenomenon. Additionally, electron-to-phonon coupling is enhanced at resonance, since:

1.) a phonon is a lattice vibration with which a discrete amount (quantum) of energy is associated; some thermal and electrical properties of the lattice are theoretically treated in terms of electron-phonon interactions; and 2.) Quantum of thermal energy used to help calculate the thermal vibration of the crystal lattice in this case S/S T304.

Phonons are packets of sound energy (waves) vibrating in a solid at ultrahigh frequencies, so high that the energy is commonly thought of as heat via electron perturbations.

The present apparatus includes several components: electrical pulsing circuits; resonant pulses circuits; a Tri-Coil Transformer (TCT) modular resonant cavity; unipolar extraction pulsed anode plates and/or grids; LE) light cluster array assembly (LED/resisters); light cluster pulsing driving circuits network; and sequencer pulsing driver circuits.

Embodiments of the present invention include a modular designed tri-coil design resonant transformer (TCT) of either the Maxwell type, as shown in FIG. 1A, or the Helmholtz type, as shown in FIG. 1B, where it is to be appreciated that like reference numerals refer to like components. In both embodiments, the TCT design incorporates the tri-coils C1, S, C2. In both embodiments, the TCT is wrapped around (or inside) the capacitor plate(s) 11, 12 and acts as part of the "closed loop" resonating electrical circuit modulated for a specific dielectric medium.

Figure 1C:
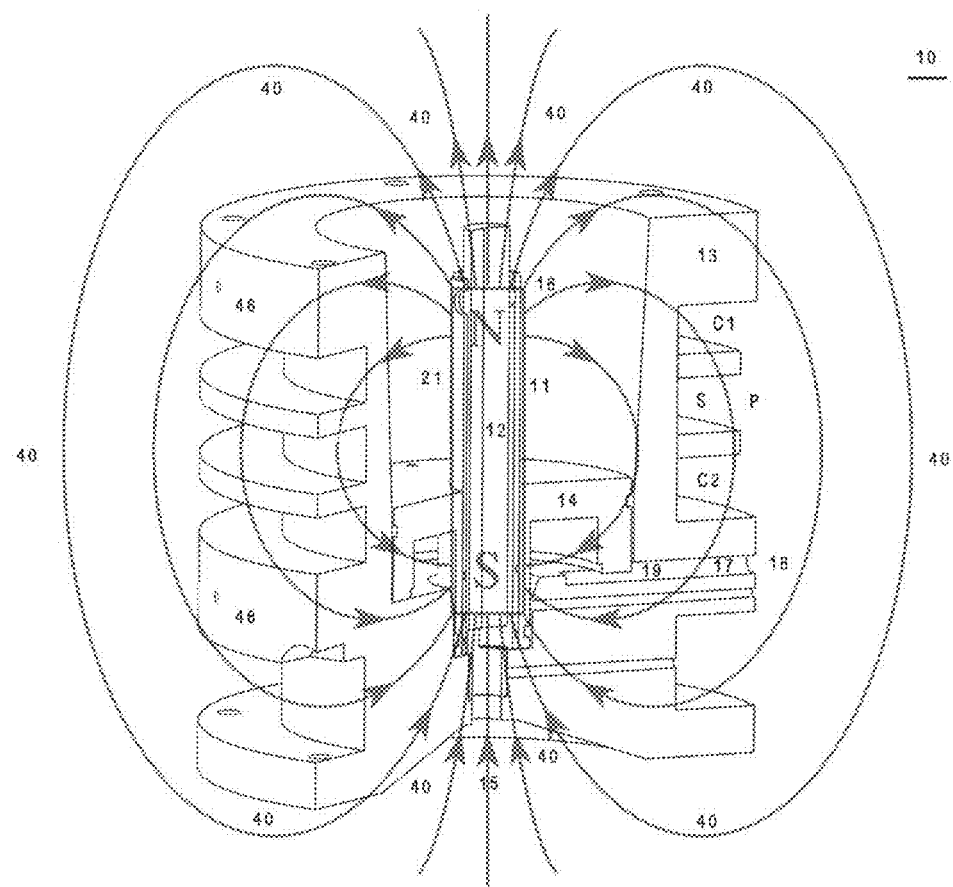
FIG. 1C depicts the magnetic flux field of the Maxwell resonant coil design according to the exemplary embodiment of the present invention.
Figure 1D:
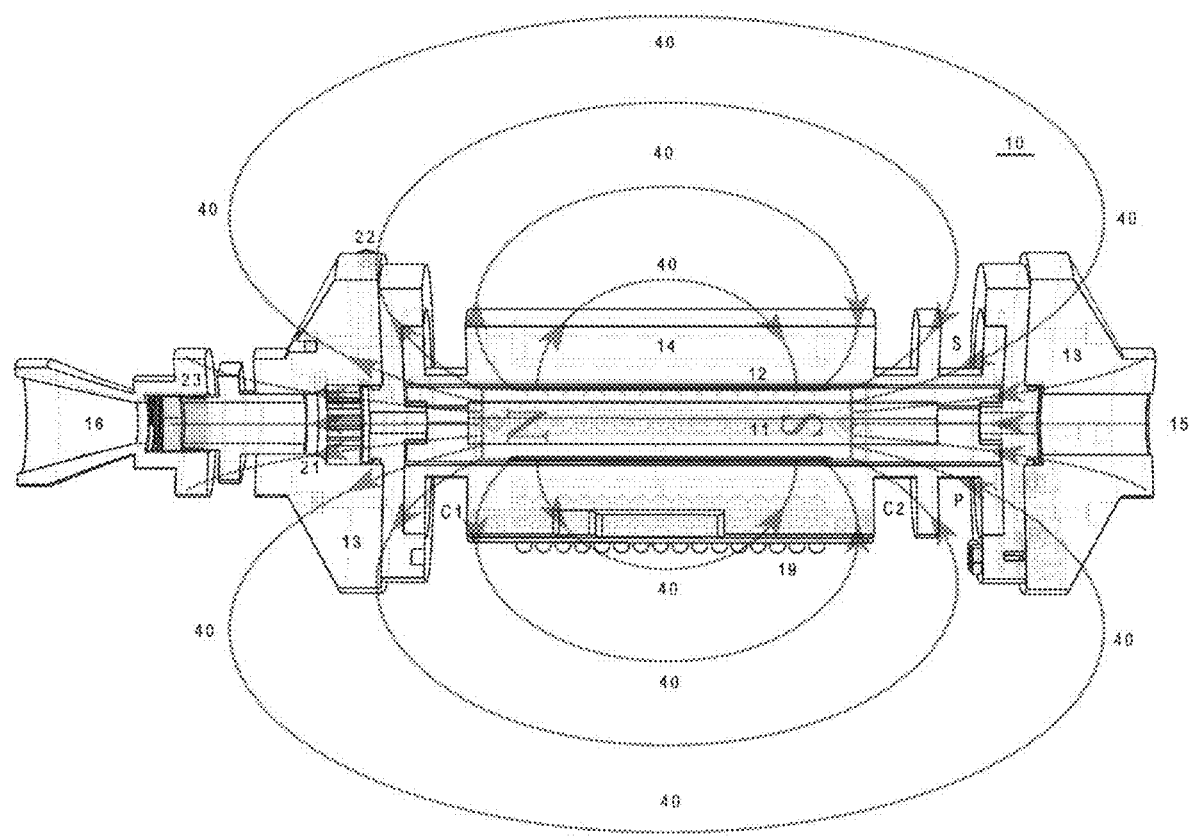
FIG. 1D depicts the magnetic flux field of the Helmholtz resonant coil design according to the alternate embodiment of the present invention.
Figure 1E:
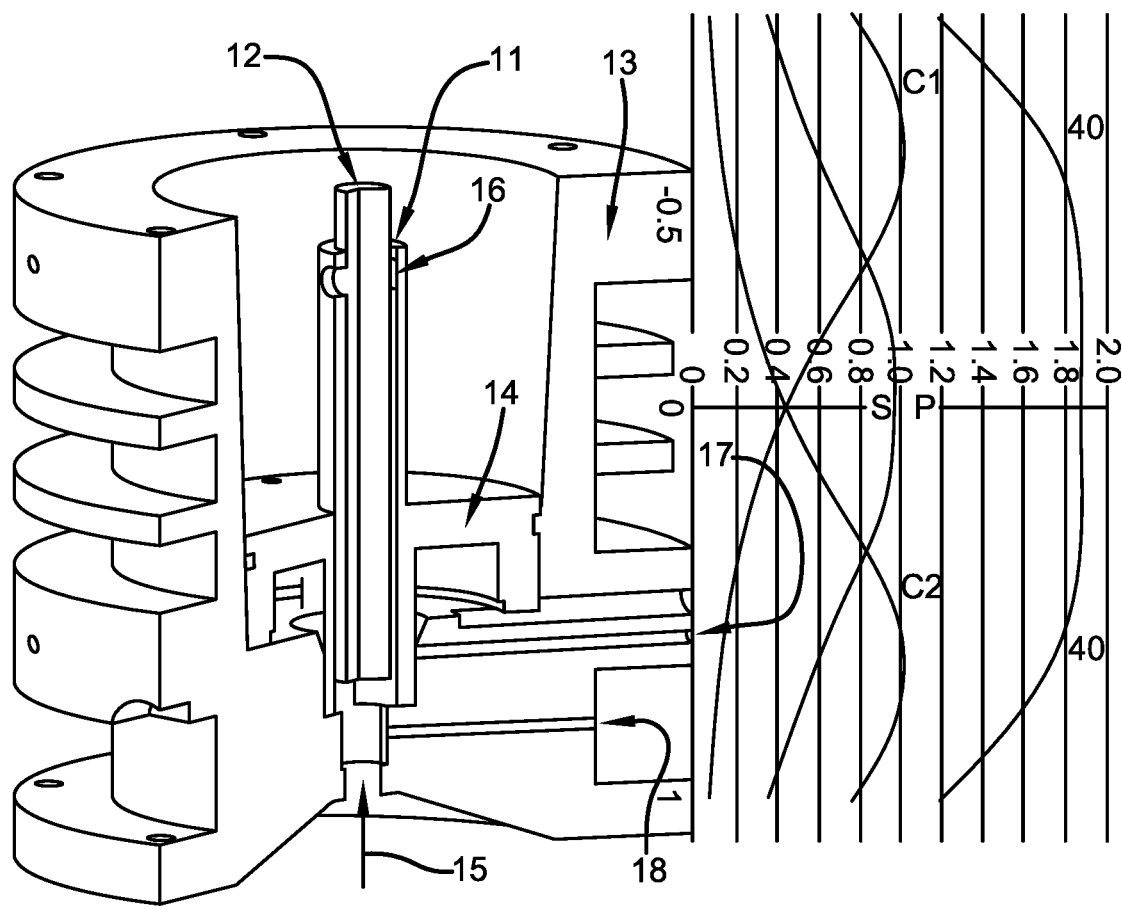
FIG. 1E illustrates the magnetic flux intensity of the Maxwell resonant coil design according to the exemplary embodiment of the present invention.
Figure 1F:
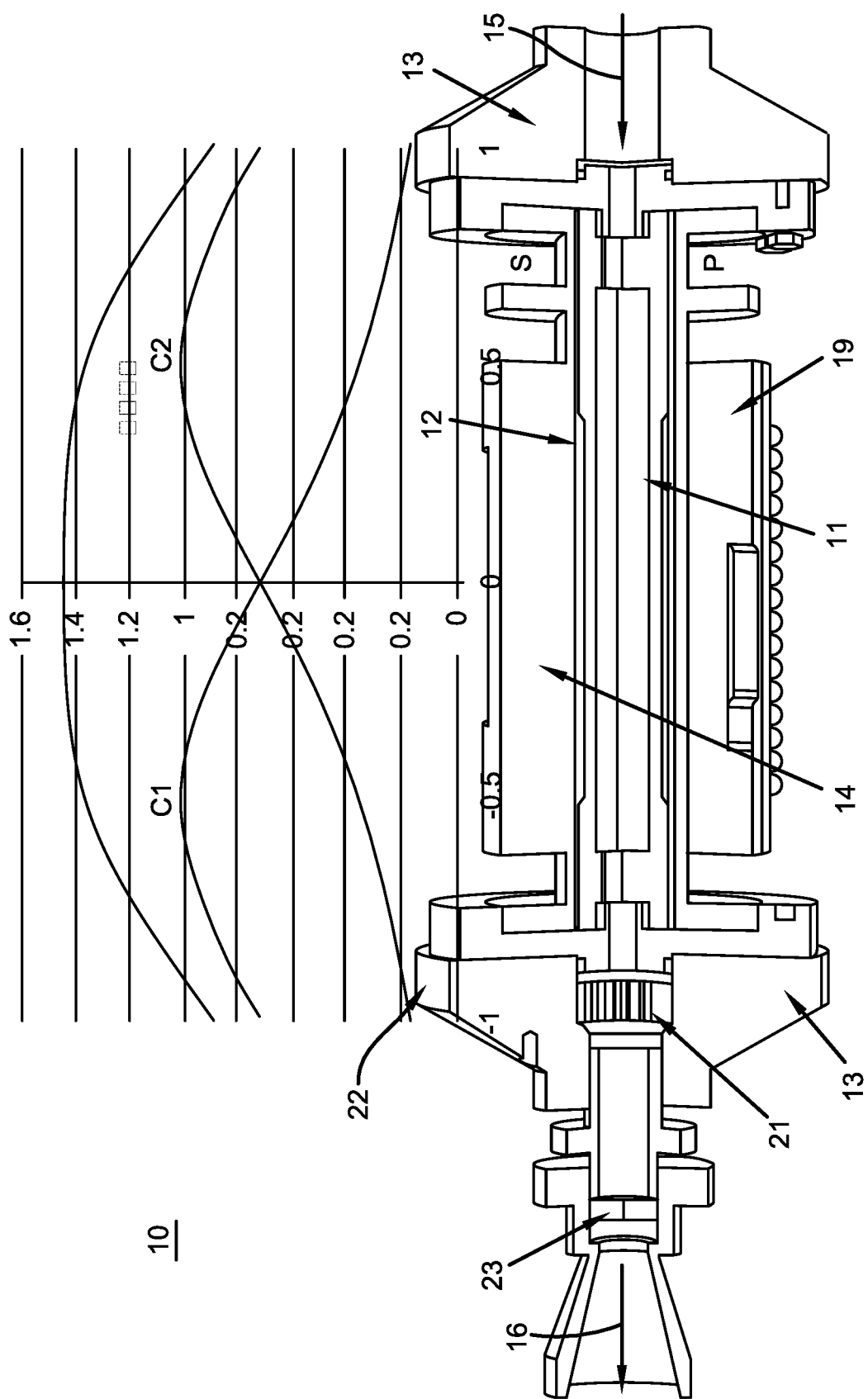
FIG. 1F illustrates the magnetic flux density of the Helmholtz resonant coil design according to the alternate embodiment of the present invention.

As indicated in FIGS. 1C and 1D, this coil design creates a toroidal magnetic field 40 within (or outside) the resonant cavity that aids in dielectric charging, destabilizing, and polarization characteristics. The modular resonant cavity can be tuned to the resonant frequency of various types of dielectric media 32 including and not limited to gaseous matter particles, natural liquids, metal liquids and the vacuum of space. Resonant frequencies are determined by dielectric constant values. Water has a dielectric constant of ~78.54. This value is used in the TCT "closed-loop" resonant RLC cavity circuit in the form of resistance. Resistance influences the overall RLC circuit matrix. Air dielectrics have higher resonant frequencies, while water dielectrics have lower resonant frequencies. Coil turns and wire gauge sizes will vary the overall resonant frequency. The systems approach is similar to impedance balancing of a speaker to amplifier. Those skilled in the art will tune for proper electrode excitation frequencies to enhance the overall physical effects to dielectrics. The Helmholtz type embodiment of FIG. 1B is tunable for gaseous matter dielectric media while the Maxwell type embodiment of FIG. 1A is tunable for natural liquid or metal liquid dielectric media 32.

The pulsing resonant cavity 10 produces a voltage which performs work upon the dielectric media within the resonant cavity using the electrostatic fields 35 produced by the capacitors 11, 12 and the magnetic flux fields 40 produced by the TCT tri-coils C1, S, C2. As indicated in FIG. 2B, optimization of the physical process on a selected dielectric medium 32 is enhanced during electrical resonance. Fermi layers 35 and magnetic flux lines 40 are maximized during resonance within the resonant cavity 10. Particle oscillations and scattering are at a maximum value during resonant pulses.

An impedance network of the "closed-loop" circuit design of the resonant cavity 10 is matched to the resonating magnetic fields 40 and electrostatic fields 35 enable the apparatus to dissociate any dielectric medium 32. Amplitude Modulation (AM) is established at the capacitor plates 11, 12 of the resonant cavity 10 through the tri-coils C1, C2, S. The capacitor plates 11, 12 (i.e. waveguides or "Exciters") can take on different shapes and sizes in order to maximize the voltage potential peaks at resonance in a manner similar to tuning radios, cell towers and telecommunication equipment.

Hereinafter follows a concise description of how the dielectric medium is dissociated by the present invention. Water molecules spin and orient themselves in reference to the voltage fields. The positive electrically charged hydrogen atoms of the water molecules are attracted to the negative voltage plate. At the same time, the negatively electrically charged oxygen atom of the same water molecule is attracted to the positive voltage plate. Increasing voltage from 1 eV to 2 eV begins elongation of the water molecule (i.e. covalent bonding). Increasing voltage levels from 3 eV to 12.6 eV dissociates or "shears apart" the water molecule and gas production is established. Any voltage higher than 13.6 eV induces elastic and inelastic electron scattering within the resonant cavity aiding in the dissociation process. Runaway self-maintained discharges or "Townsend" events may take place during high voltage inputs.

Since the water molecule is constructed of an electron matrix, the electrons have dipole magnetic moments which seek lowest energy states. While water is exposed to pulsing magnetic field lines the hydrogen (protium) atom spin states flip from down to up and with each subsequent unipolar pulse burst continues this emission process. With each pulse, the hydrogen atom (protium) emits a 21-cm electromagnetic photon with a given value of momentum. Any stimulation of photon emission (high or low modulations) within the resonant cavity destabilizes neighboring electrons and molecules as they probabilistically absorb the emitted EM from neighboring atoms. In addition to photon emission from the protium atom, the magnetic field lines cause charged particle deflection "BACK" towards the cathode. This aids the electrostatic dissociation process through Bremsstahlung electron braking effects in reference to the electrostatic field lines of the electrodes and perpendicular magnetic field lines. This is quite important in the efficiencies of the resonant cavity at higher voltage levels.

Laser or photon energy of a predetermined wavelength and pulse-intensity are exposed to and absorbed by said gas ions. The highly energized nuclei cause electron deflection to a higher orbital states (electron shell jumps). Laser-Pulse bursts are emitted as light intensity is varied to match the absorption cross-section of the gas nuclei. 660 nm (Deep Red 5 mm LEDs) are used to target the hydrogen's electron first (i.e. low energy) orbit jump during excitation. Anytime a quantum electron jump occurs, the atomic nucleus is destabilized or weakened momentarily; this is due to the innate angular momentum spin of electrons inference to the nucleus spin. Continued exposure of the gas ions to the laser or light energy during voltage stimulation prevents atomic stabilization. This allows electrostatic voltage forces to be ENHANCED OR BOOSTED in the mode of dissociation of the water molecule using only a "physical" force.

Natural water has a resonant frequency in the microwave range at a wavelength of 21 centimeters. The resonant cavity 10 is tuned to the dielectric constant as a RLC resonant tank circuit in order to dissociate water molecules. Other dielectric media 32 can be tuned to respective higher or lower resonant frequencies depending on electrode size and spacing. Higher ranges are necessary for larger and longer "Exciter" electrodes 11, 12. The ranges of resonant frequencies from audio, radio, microwave and infrared ranges can be selected depending on the specific dielectric medium 32.

The resonant frequency of water resonance is 2.4 Ghz, which is in the microwave range. The microwave spectrum ranges from 30 cm (1 Ghz) to 1 mm (300 Ghz). A 21-cm electromagnetic wave is actually the "hydrogen-fine-flip" state. The "red-shift" is also associated with this frequency in astronomy. Also, 21-cm electromagnetic waves are strongly associated with magnetic resonance chambers (i.e., MRI machines). The present apparatus 10 uses the magnetic field lines of the Maxwell and Helmholtz coils of the TCT to flip the hydrogen atoms in the cavity to destabilize the dielectrics 32 for both dissociation and fusion applications. (i.e. electron matrix Pauli Exclusion principles—up and down states of electron spin.)

Maximum voltage potentials can be determined by wrap turn counts of the secondary coil S such that, the greater the turn count, the larger the voltage potential on the capacitive plates 11, 12. Turn count on the coil C1 can also be increased to further stimulate the atomic excitation and decay of the selected dielectric medium 32. In an exemplary embodiment of the present invention, a Maxwell resonant cavity filled with water dielectric (well water) may resonate with the following parameters:

C1: 100 turns (24 awg stainless steel resistive wire 430FR.)
C2: 100 turns (24 awg stainless steel resistive wire 430FR.)
Secondary: 400 turns (30 awg stainless steel resistive wire 430FR)
Primary: 100 turns (24 awg magnetic copper wire)

The resonance voltage spikes at 30 Khz, which is too high for the electron-phonon Helmholtz resonator phenomenon (i.e., electron-coupling) to "Exciters" 11, 12. Those skilled in the art will properly tune for resonance.

In the preferred embodiment, the coils C1, C2 are bifilar coils in which a bifilar wrapped inductor is understood to be a winding made non-inductive by winding two wires carrying current in opposite directions together, side by side, as one wire. The bifilar coil design of coils C1, C2 establishes opposing magnetic field flux fields (N & S to S & N) which in turn establishes an electron blocking, shielding, repulsive action upon the electrons within the wire configuration. Bucking of the transformer thus becomes much more stable and efficient with higher voltage oscillations.

In the preferred embodiment, the bifilar choke coils can be composed of resistive stainless steel 430F or 430FR wire. This application enhancement uses resistive wire, which retards electron drift velocity from the resonant cavity 10 during pulsing operations. The magnetic field lines 40 are further strengthened due to the stainless steel lattice due to electron braking action within the choke wire. Resistive wire allows voltage pulse frequency potentials to enter into the resonant cavity (bypass coil filter principles) while restricting current influx due to the "skin effect" phenomenon.

In the preferred embodiment, resistive wire is used in the coils C1, S, C2 to promote electron movement retardation. Drift velocity of electrons through the TCT is slowed by using resistive coil wire due to increased magnetic field strength 40 upon on the "forced" migrating electrons in the resistive wire. The primary coil P is preferably made of copper or non-resistive wire. The magnetic wire thickness should be sized properly for the unipolar pulse 44 charge(s) to withstand operational rates. Those skilled in the art shall properly engineer for long duration operations. Due to a high resistive ohm value of the resistive wire, the signal bandwidth Q of the RLC circuit resonance is modulated to a much lower value.

As shown in FIG. 2B, the atoms of the dielectric medium 32 are electrically primed with the electric pulsing (i.e. square wave pulse A) inputs to primary coil P of the transformer 10. This is accomplished using an opto-coupler 45 or phototransistor network in conjunction with power transistors C38M as the primary driving units within a closed loop circuit. A dielectric medium holds a specific charge for a given time due to dielectric relaxation. Once the medium is charged to a desired voltage level, the dielectric's fermions are extracted using the (S) &(C) pulsing network from extraction unipolar pulses 44 and SCR fast switching mode of network C38M or 2N6678 power circuits.

The primary coil P is charged per unipolar pulse 44 from the power driver circuit network 43. The choke coil C1 is a frequency bypass coil and energized simultaneously as the primary coil P is pulsed. The ultra-fast diode D1 (preferably of the type MUR 4100E) is connected between the secondary coil S and the coil C1, which, acts as a frequency "doubling" on the anode electrode 11 of the resonant cavity 10 during pulse operations. Coil C1 is a choke coil, which is an impedance coil.

The diode D2 (preferably MUR 4100E) shown in FIG. 2B acts as a rectifying modulation diode to the input frequency to the anode 12 of the present invention. This acts as a diode switch to keep all pulses to the resonant cavity positive in nature. Diodes D1, D2 also act as a half-wave rectifier to the circuit. However, when the capacitor (anode) 11 fully saturates the rebounding wave from the capacitor, it interacts with a rebounding wave of the inductor coil C1 to produce wave interference which creates an electric "sloshing" in the electro-conductive wire on the anode 11 side of the TCT cavity 10. This in turn causes the frequency "doubling" to occur. The wave interference within and between coil C1, diode D1, and the anode 11 produces dissonance, or the formation of maxima and minima by the superposition of two sets of interference fringes from light of two different wavelengths.

The electron flow within the coils C1, S becomes a tuned impedance balanced system during proper resonant frequency operations. The electrons 33 from the dielectric medium 32 now become electrically coupled to the coils within the closed loop electrical RLC system. Positive 11 and negative 12 voltage zones are thus formed simultaneously in the electrical field of the "Exciters."

As shown in FIGS. 1A and 1B, the acrylic lens 14 can alternatively be a glass medium with a specific index of refraction to influence the propagating photons from the light cluster array pulsing network 14. The influence, depending on the index of refraction, subsequently retards the speed of the moving photon wave packet via wave superposition, which further enhances the ability of the electron extraction grid 21 to "anode-snatch" migrating electrons from the Fermi layer of the resonant cavity 10. Diffusion/diffraction grating lenses can be placed on or below the acrylic or glass lens 14 if the source lighting happened to be white light. The acrylic or glass lens 14 placed between the light assembly cluster array 19 and the resonant cavity 10 disrupts the photon wave propagation into the voltage zones of the capacitors 11, 12.

The laser cavity assembly 14 can be arranged with linear overlaid LEDs to enhance the photon migration properties during each light pulse burst to the anode 11. Photon bursts are aimed to target the expelled gas atoms of hydrogen and oxygen to further migrate orbiting electrons. This allows for anode 11 to capture free electrons with ease.

Figure 2A:
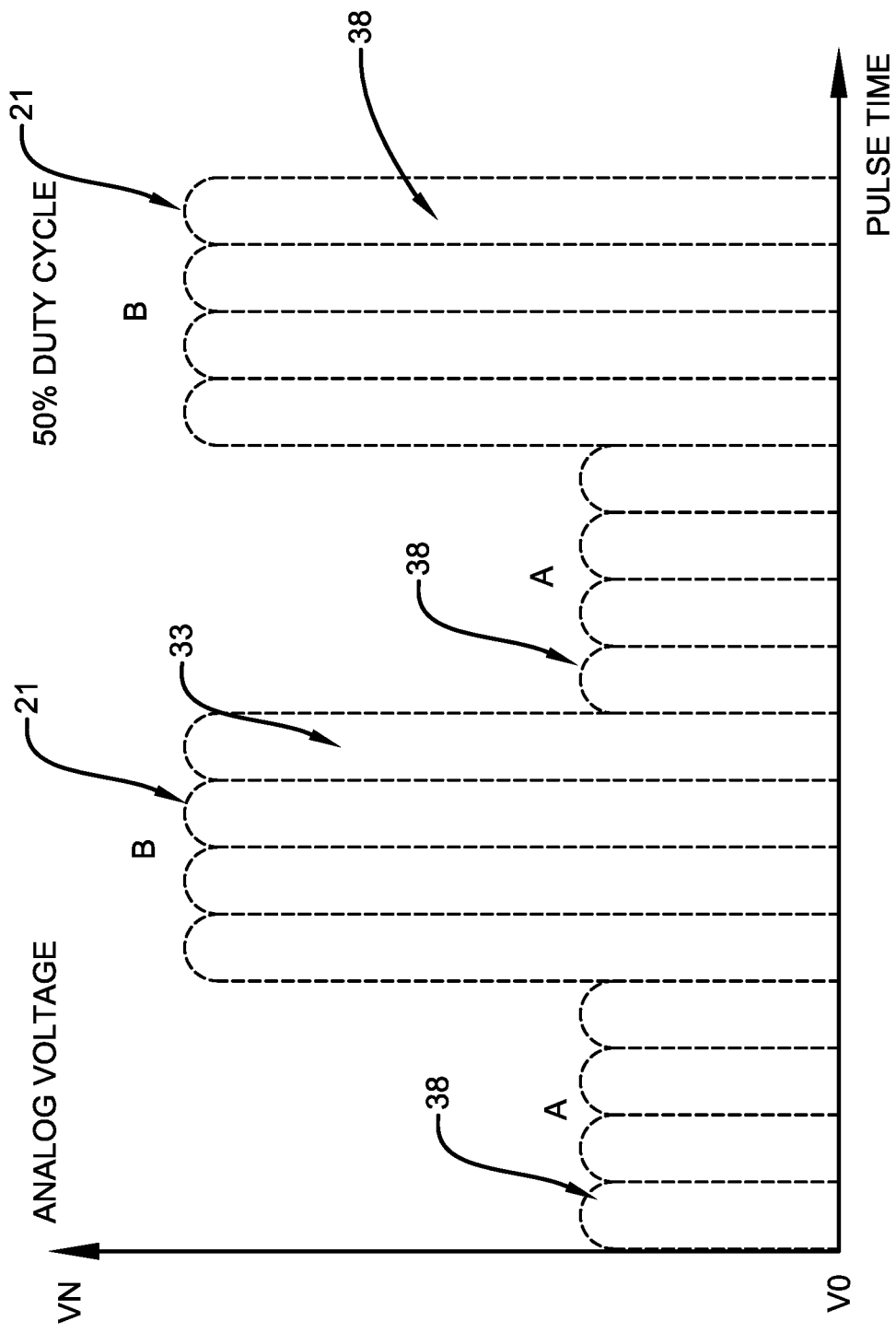
FIG. 2A illustrates the pulse timing network to the resonant cavity in accordance with an embodiment of the present invention.
Figure 2B:
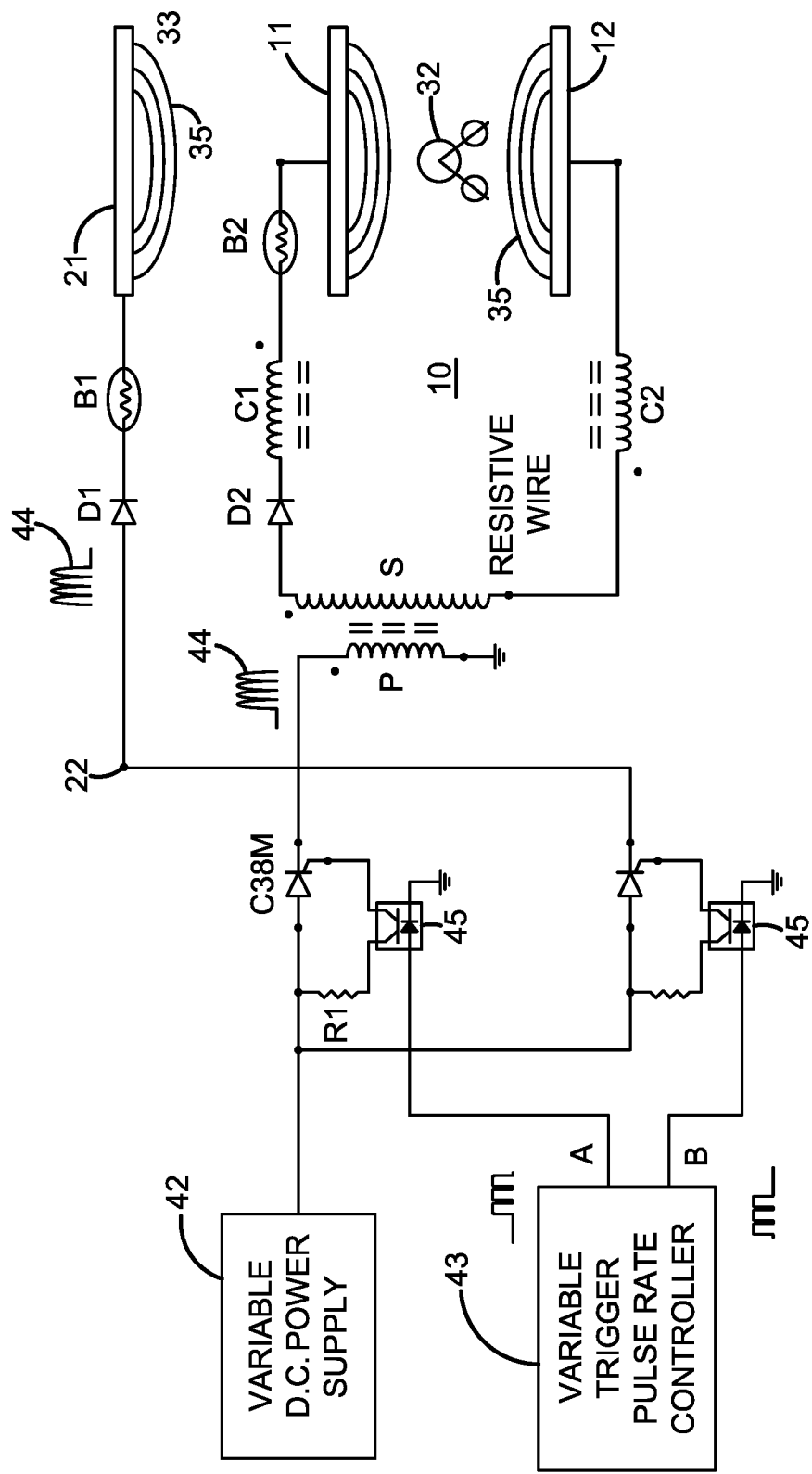
FIG. 2B is an electrical schematic breakdown of the device and coils in conjunction with pulse timing network in accordance with an embodiment of the present invention.

As shown in FIG. 2A, electrostatic charges potentials are maintained with the primary transformer pulses A during resonance. Extraction transformer pulses B are activated as primary pulses A are turned off. This process repeats during operation while voltage inputs are attenuated between pulse A and B. Because a voltage potential is being subjected to the resonating capacitor, the higher the voltage from VO to VN the higher the electrostatic and electromotive work applied within the cavity 10. The extraction pulses B are positive "unipolar" 44 in nature within the closed loop circuit.

As indicated in FIG. 2B, resonant frequency ranges 43 are achievable from 1 kHz-150 kHz with the resonant cavity transformer 10 of the present invention. These frequency ranges are influenced by construction of the resonant cavity 10, the size and shape of the electrodes 11, 12, the diameters of the coils C1, C2, S, P, the diameter of the wire, the resistance (ohm values) of the wire, the dielectric constant values and relative temperatures. These low frequency ranges also mitigate the use of exotic electrical components.

The natural harmonic frequencies of the "Exciter" capacitive plates of a plurality of resonant cavities should be matched to the electrical resonant frequencies of the RLC closed loop circuit.

The atomic composition of the electrodes 11, 12 can dictate the fusible substrate within the dielectric medium 32. The electrodes 11, 12 are preferably formed of 304 Stainless Steel. This material is not typically ferromagnetic, however once machined, the material's electron dipole moments are aligned to a slight degree, giving the electrodes a modest ferromagnetic property. Aligning the semi-ferromagnetic electrodes of machined 304 Stainless Steel within the TCT allows for an optimized hysteresis curve during operations. The magnetic flux field(s) are thus, guided by the electrodes 11, 12 in the resonant cavity 10. The operational frequencies of this transformer can range from 1 kHz-100 kHz. The magnetic field strength of the primary coil P is synchronized with the extraction pulsing unipolar positive input 44.

The configuration of components in the present invention results in a Maxwell or Helmholtz type resonant cavity 10, a new type of semi-ferromagnetic core transformer, unlike a conventional ferromagnetic or air-core transformer. This device utilizes the iron from the electrodes 11, 12 to aid in the hysteresis curve during pulsing transformer operations. Stainless Steel 304T can have anywhere between 70%-80% iron content to the crystal lattice structure. Machining and/or turning Stainless Steel 304T helps aid the magnetic properties as the carbide tips help align the electrons of the material after lathe or machining operations.

The frequency bypass coil C1 and the amp restricting coil C2 should be properly spaced with the electrode to induce the desired magnetic flux lines 40 inside or outside the cavity 10 during operational pulses, as shown in FIGS. 1C and 1D. The magnetic flux 40 induces further surface charge on the electrodes 11, 12 through the Hall effect. These pulses are established with a 50% duty cycle circuit design. Once resonance has been established, the voltage pulse amplitude can be attenuated and/or the duty cycles can be tightened for greater dielectric dissociation.

A Delrin insulator cap can be placed over the exit port 16 in order to recycle the electrical process. Electrically insulating material over the electrodes 11, 12 amplifies and stabilizes electrostatic flux within the cavity 10. The apparatus can operate at 110V input at 0.2 amps (or lower) current draw once resonance is established with the selected dielectric material 32. This value can be further optimized using resistive coil wire designs and unique bifilar Tesla coil configurations. Other coil designs can be implemented to enhance desired effects. Voltage values increase uniformly while amp draw is limited to minute levels due to resonance characteristics of the TCT design.

Integrating voltage step-up in the secondary coil S to silicon controller rectifier (SCR C38M) mode of operations while inputting 114V at 0.83 A of current has been found to produce an enormous polarization potential on certain dielectric mediums. The SCR C38M component is available from Jameco Electronics as PIN 14859 where the power rating for this component is 600 volts at 35 amps. In addition to the SCR power driver, a 2N6678 N transistor may be placed in for the C38M component.

The input power-supply of the apparatus is universally connected to the interfacing circuits "closed loop" circuit. An AC to DC rectified voltage supply can vary from 0V-220V input VO-VN to the resonant cavity 10. For military applications, a radio transmitter power supply can be utilized for even higher DC input potentials, as long as the internal electrical components are adjusted for proper voltage ratings and frequency ratings to establish a working system. System power draw performance is held to a minimum due to the design of the TCT cavity 10 utilizing resistive wire wrapping due to drift velocity retardation of the electrons. Thus, current consumption techniques are held to an optimum. The magnetic field strength of the present invention during resonant pulsing operations yields high production of atomic dielectric separation. Increasing the voltage to the power supply 42 increases the electromotive inertia of the electrons within the closed-loop circuit of the resonant cavity 10.

Electrical systems for pulsing network are possible with modern day integrated chips. The 7404, 7490 and the NE555 are just some of the IC chips used to facilitate the proper pulsing network to the tri-coil transformer. The duration and stability of the operations are reliant upon the systems engineering and calibration of the transformer to the fabricated circuit board designs. Transistors, Silicone Controlled Rectifiers, phototransistors, diodes, resistors, axial capacitors, potentiometers and other electrical devices must be arranged in a specific manner for proper operations. This is not always innately intuitive for the conventionally trained electrical engineer.

Figure 2C:
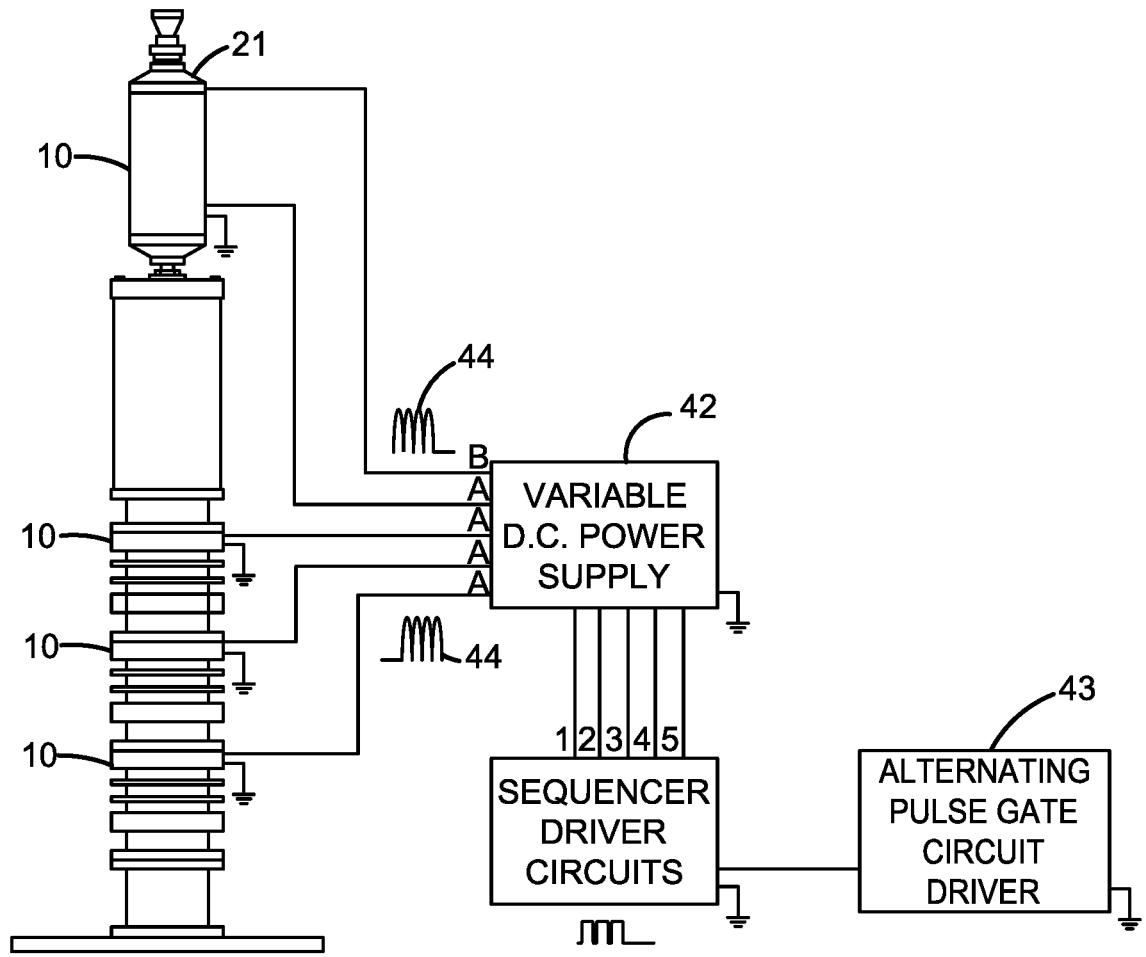
FIG. 2C is a block diagram layout of an electrical system in accordance with an embodiment of the present invention.
Figure 2D:
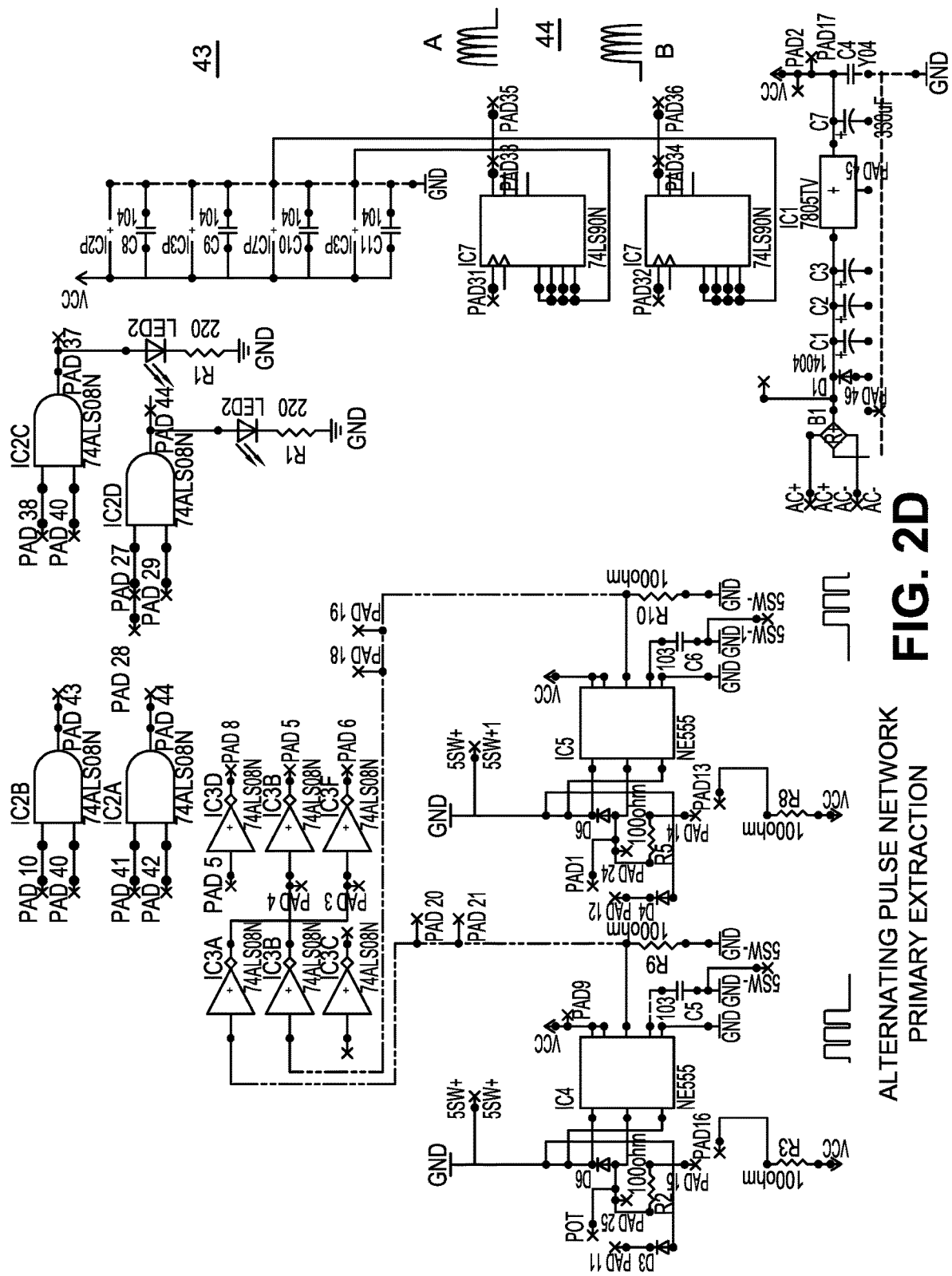
FIG. 2D is a schematic of an alternating pulse network in accordance with an embodiment of the present invention.

A circuit design network for pulsing is depicted in FIG. 2D. A pair of NE555 chips are used to establish two different variable pulse frequencies. One of the NE555 chips is used for a cutoff GATE and the other NE555 chip is used for DUTY CYCLE FREQUENCY. These two NE555 chips are attenuated to establish variable GATE pulse width and pulse FREQUENCY. The 100K variable resistor(s) that are connected to the NE555 chips are adjusted to change the pulse timing exit pulses of GATE and the FREQUENCY square waves. Diode array affix to the NE555 chips allows for proportional availability during frequency adjustments. The NE555 pulses are fed into a 7404 hex-inverter, which "flips" the signal establishing two alternating pulses. These signals are then crossed and overlaid into the 7490 decade divider counter chip. These slow the signal down to the proper ranges for the TCT in order to establish unipolar resonant frequencies within a "closed-loop" electrical circuit. The circuit design is modular in design to enable a large arrangement of pulse widths, gates, and frequencies. For simplistic applications to the TCT, commercially purchased signal generators are readily available having a 1 hz-150 Khz PWM pulse frequency duty cycle adjustable module, sold as model number XY-PWM1 at online retailers including eBay and Amazon.

As shown in FIG. 2C, an electrical system 43 for sequencing of pulses to the cavity 10 allows for additional charging of the destabilized atoms. A series of cavities 10 are arranged as stages where each subsequent stage is sequentially pulsed to increases the charge. Each stage or tier of the system promotes and amplifies the destabilization properties of the dielectric medium 32 through ramping charge polarity. The power supply 42 is integrated into the pulsing electrical circuit network through phototransistors, transistors and SCR electrical components. This circuit is interfaced with the cavity 10 to perform work on the selected dielectric material 32.

The resonant cavity 10 is isolated and/or insulated with electrically neutral materials such as Delrin or acrylics or polyethylene plastics. Insulating caps can be placed above the electrodes to can aid in stopping voltage leakage in the resonant cavity. Electrical shielding such as thin copper, stainless or wire braid plating can provide external RF shielding around the cavity 10 to protect the pulsing coils from outside interfering electromagnetic interferences (i.e. cell towers, radio waves, etc.).

A Delrin insulating cap can be affixed to the "Exciters" 11, 12, as shown in FIG. 3D. The Delrin cap serves three functions:

1.) Performs as a means to limit voltage drop;
2.) Recycles the fuel gases as they are manufactured between the "Exciters" 11, 12;
3.) Secondary electron extraction stages on the outside surface of the anode 11 promote electron pressure differential within the dielectric medium 32. This further enables the extraction pulses while the LED cluster 19 pulses light intensity and targets electron orbitals to elongate, which in turn promotes surface charge density capture of free electrons to the anode 11.

Figure 2E:
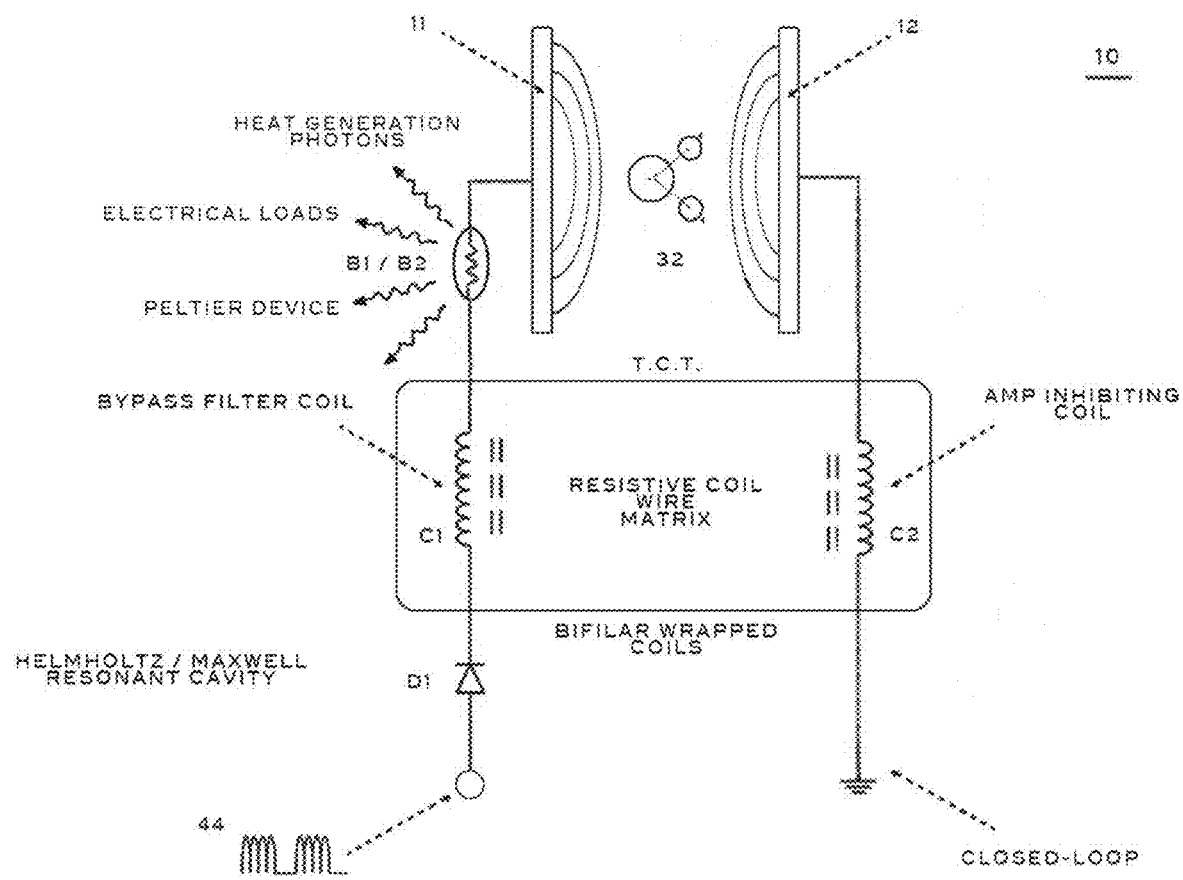
FIG. 2E is a schematic view of a bifilar Helmholtz/Maxwell resonant cavity in accordance with an embodiment of the present invention.
Figure 2F:
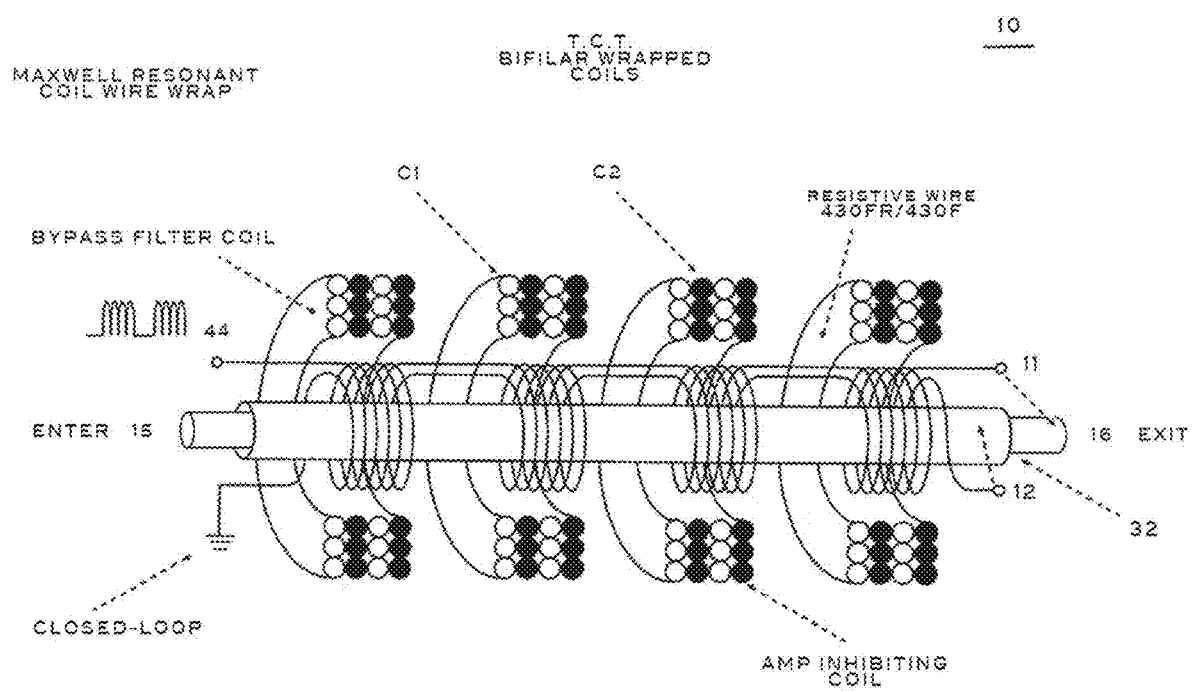
FIG. 2F is a depiction of a bifilar Maxwell resonant coil wire wrap in accordance with an embodiment of the present invention.

Free electron capture of anode 11 may feed electronic loads such as light bulbs B1, Peltier devices, fans and any other amp consuming device(s). The interfacing of LED/Resistor 19 cluster array can be connected between C1 and D1 of the TCT to establish self-sustaining energy oscillations within the resonate electrical "closed-loop" system (see FIG. 2E).

As shown in FIG. 1A, the cavity 10 is a Maxwell style tri-coil configuration wrapped around an electrode design characteristic of a cylinder waveguide/antenna. The outer cylinder tube is 4.00 inches long with an outside diameter of 0.75 inches. The tube is preferably smooth finished for operational stability. The center electrode 12 is 0.50 inches in diameter and resides inside the outer tube electrode 11. Materials are commercially available from OnlineMetal.com or any other metal supply company. The main gap spacing between the two electrodes is approximately 0.0625 inches. In applications where water is the dielectric medium 32, a unipolar input voltage of dissociation of 26.5 volts is applied to the primary coil P. Operational resonant frequencies can vary from 1 kHz-50 kHz depending on the coil turn counts, waveguide size and the cavity's coil ohm values. Furthermore, the extraction unipolar pulse(s) induce particle movement inside the resonant cavity 10.

The embodiment of FIG. 1B is especially configured for gaseous liquid matter, gas matter and vacuum dielectric materials. The Helmholtz coil configuration is utilized for magnetic flux field influences that targets ambient air, noble gases and combustible gas atoms. Any gaseous medium that enters the resonant cavity 10 is subsequently atomically primed and destabilized using pulsed voltage and magnetic field strength. Voltage potentials can reach up to 17,000 volts without amp discharging effect. The positive electrode 11 is 0.50 inches in diameter at 7 inches long. The outer electrode, which is the negative electrode 12, is 1.00 inches in diameter at 7 inches total length. Electrons are primed and ultimately stripped from the voltage zones. The electron extraction grid 21 further destabilizes the gases as they prepare to leave the resonant cavity 10. Primary pulse(s) are inversely pulsed to the extraction pulse(s) in order to maintain stable operations.

The present invention provides an improved method of converting water as a dielectric material into its hydrogen and oxygen constituents for energy propulsion by breaking the covalent bonds of the water molecule. The present process extracts or"plucks" electrons from the atoms of oxygen and hydrogen for atomic destabilization. Simply, combustible fuel gas is vectored for heat and thermal energy by attenuating input voltage potentials. The extraction pulses further destabilize the oxidizing oxygen and the fuel source atom of hydrogen thus increasing the potential atomic energy yield of the exiting fuel gases.

The present invention also enables the purifying of drinking water by the process of separating water into its atomic structures and also through burning. Through burning, hydrogen and oxygen are converted back to pure water, which is captured for drinking. The 5,000-degree burn temperatures of natural water will vaporize any bacteria or viruses in the water.

The present invention also provides super-heated steam applications with unique coil configurations and unified with time alternating or "switching" delayed unipolar pulses to the resonant cavity 10. This is achieved using atom to electron "snapping" during on/off pulses of unipolar positive voltage zone(s) to generate frictional force upon the water bath.

The present invention also yields unique arrays of fused atomic structures including, but not limited to, magnetite (Fe3O4). The fused/transmuted structures occur as a direct result of the destabilization-rearrangement process described hereinabove. Those skilled in the art may incorporate this process to manufacture known and unknown atomic structures by simply varying the dielectric medium and the electrode composition.

The embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A pulsing resonant cavity for performing electrolysis upon a dielectric medium, comprising:
   a generally cylindrical housing having an interior and an exterior and a cylindrical axis, and including a flow passage having an entrance port and an exit port for respectively admitting and discharging the dielectric medium;
   a tri-coil assembly formed on the exterior of the housing centered on the cylindrical axis, the tri-coil assembly having primary and secondary coils retained centrally between first and second exterior coils to create a toroidal magnetic field within the resonant cavity oscillating at a resonant frequency of the dielectric medium within the flow passage, to dissociate the dielectric medium;
   a positive electrode and a negative electrode concentrically located in the interior of the housing, centered on the cylindrical axis, wherein the positive and negative electrodes are cylindrical and spaced to define the flow passage therebetween, wherein the positive and negative electrodes create an electrostatic field within the flow passage to dissociate the dielectric medium;
   a light assembly cluster array concentrically mounted around the positive and negative electrodes for pulsing light intensity and targeting electron orbitals in the dielectric medium in the flow passage to dissociate the dielectric medium; and
   an acrylic lens retained concentrically between the light assembly cluster array around the positive and negative electrodes and centered on the cylindrical axis to disrupt photon wave propagation into voltage zones of the electrodes.

2. The pulsing resonant cavity of claim 1, further comprising a first terminal for applying a +5 volt DC pulse to the light assembly cluster array and a second terminal for applying a −5 volt DC pulse to the light assembly cluster array.

3. The pulsing resonant cavity of claim 1, further comprising an electron extraction grid to capture electrons migrating from the resonant cavity.

4. The pulsing resonant cavity of claim 1, wherein the first and second exterior coils are bifilar coils that establish opposing magnetic field flux fields.

5. The pulsing resonant cavity of claim 1, wherein the dielectric medium is water and the resonant frequency is between 1 Hz-1 Mhz for dissociation into hydrogen and oxygen.

6. The pulsing resonant cavity of claim 1, wherein the positive and negative electrodes are spaced at 0.0625 inches.

7. The pulsing resonant cavity of claim 1, wherein the light assembly cluster array is an LED cluster.

8. The pulsing resonant cavity of claim 1, wherein the housing is made of polyoxymethylene.

9. A pulsing resonant cavity for performing electrolysis upon water, comprising:
   a generally cylindrical housing having an interior and an exterior and a cylindrical axis, and including a flow passage having an entrance port and an exit port for respectively admitting and discharging the water;
   a tri-coil assembly formed on the exterior of the housing centered on the cylindrical axis, the tri-coil assembly having primary and secondary coils retained centrally between first and second exterior coils to create a toroidal magnetic field within the resonant cavity oscillating at a resonant frequency between 1 Hz-1 Mhz within the flow passage, to dissociate the water into hydrogen and oxygen;
   a positive electrode and a negative electrode concentrically located in the interior of the housing, centered on the cylindrical axis, wherein the positive and negative electrodes are cylindrical and spaced to define the flow passage therebetween, wherein the positive and negative electrodes create an electrostatic field within the flow passage to dissociate the water into hydrogen and oxygen;
   wherein the first and second exterior coils are bifilar coils affixed to the resonant cavity and positioned around the positive electrode and the negative electrode;
   a light assembly cluster array concentrically mounted around the positive and negative electrodes for pulsing light intensity and targeting electron orbitals in the water in the flow passage to dissociate the water into hydrogen and oxygen; and
   an acrylic lens retained concentrically between the light assembly cluster array around the positive and negative electrodes and centered on the cylindrical axis to disrupt photon wave propagation into voltage zones of the electrodes.

* * * * *